Nov. 19, 1935.  H. NEUWIRTH  2,021,697
THERMOMETER
Filed Oct. 17, 1934
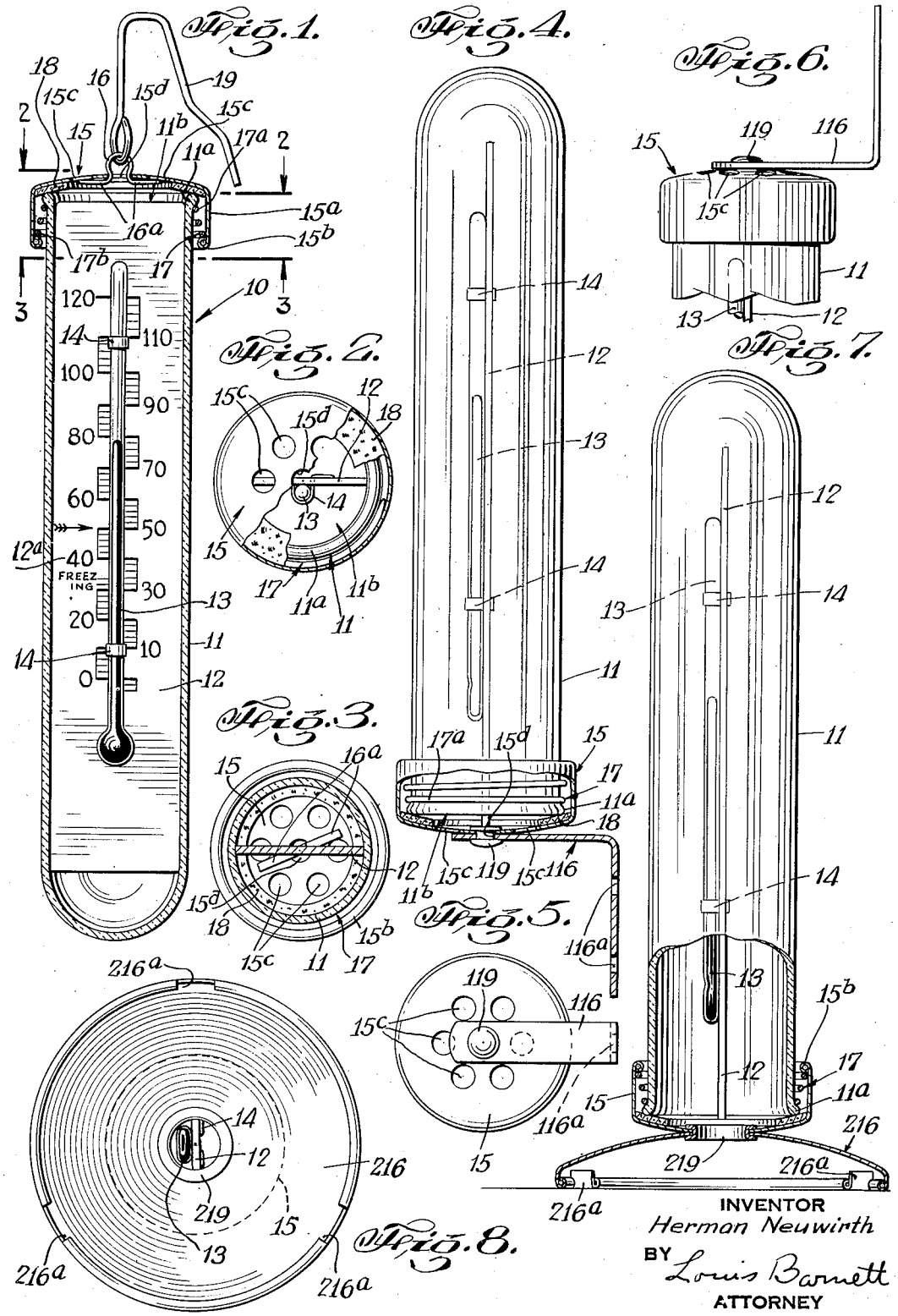
INVENTOR
Herman Neuwirth
BY Louis Barnett
ATTORNEY Patented Nov. 19, 1935

2,021,697

UNITED STATES PATENT OFFICE 2,021,697

THERMOMETER

Herman Neuwirth, New York, N. Y.

Application October 17, 1934, Serial No. 748,618

2 Claims. (Cl. 73—52)

This invention relates to the construction of thermometers and other devices and more particularly is directed to thermometers for general use, for indicating the temperature in refrigerators, household and outdoors; and devices for other purposes.

Among the objects of the invention is to generally improve construction of the character described whereby very few and simple parts are required, which shall be easy to assemble, cheap to manufacture, and shall be efficient and practical to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

Fig. 1 is a central sectional view taken through a suspendable type refrigerator thermometer constructed to embody the invention;

Figs. 2 and 3 are cross sectional views corresponding to cuts taken on lines 2—2 and 3—3, respectively, in Fig. 1;

Fig. 4 is a front elevational view of a thermometer adapted to be mounted in upstanding position against a vertical support, partly broken away to show the interior construction;

Fig. 5 is a bottom plan view of the thermometer shown in Fig. 4;

Fig. 6 is a fragmentary view of the thermometer construction shown in Figs. 4 and 5 with the means assembled for overhead mounting against a vertical support;

Fig. 7 is a front elevational view of a table, desk or shelf type thermometer, partly broken away to show the interior base construction, and Fig. 8 is a bottom plan view of the thermometer base shown in Fig. 7.

Referring in detail to the drawing, 10 denotes a thermometer constructed to embody the invention adapted to be suspended in a refrigerator and for like purposes. The thermometer 10 is seen to comprise a suitable glass container, such as a test tube 11, having an outturned flange 11a on the single open end 11b thereof. In said tube 11 there is fitted a scale sheet member 12 carrying a spirit or mercury tube 13 mounted by spaced clips 14 against the front side of said scale member 12. The tube 13 may be of any conventional construction and is calibrated and adjusted to read temperature markings 12a imprinted on the front side of the scale member 12 in the well understood manner.

The tube opening 11b has a closure cap 15 seated thereon, said cap being provided with a lateral extended flange portion 15a terminated by inturned rim edge bead 15b. The mid-portion of the cap 15 may be provided with spaced openings 15c to permit the passage of outside air into the tube 11, and a center opening 15d through which an eyelet 16 extends. The inner end 16a of said eyelet 16 is spread apart so as to anchor the eyelet 16 to the cap 15. The eyelet 16 may engage with any suitable ready detachable means such as hook 19 for attaching to a support. To secure the cap 15 in position over the tube opening 11b, there is provided a suitable resilient or yieldable coupling and as here shown, said coupling comprises a helical wound spring 17 which normally has one end 17a thereof of a diameter less than that of the outturned tube flange 11a, the other end of said spring 17b preferably being of slightly greater diameter than that of the inturned bead 15b of the cap flange portion 15b. Said spring 17 is inserted as shown in Figs. 1, 4 and 7 so as to retain the cap 15 on the test tube 11. Preferably a resilient washer or gasket 18 made of cork, rubber or other suitable material may be interposed between the tube flange 11a and the interior side of the cap 15 to act as a shock absorbing means to eliminate possible breakage in handling the thermometers 10.

From the above description and Figs. 1, 2 and 3, the invention will now be apparent. After providing the simple parts as shown in the above mentioned figures, the thermometer 10 may be readily assembled by inserting the scale member 12 with the spirit tube 13 mounted thereon, into the test tube 11, and applying the closure cap 15, the spring 17 first being inserted in position in said cap. Said spring 17 preferably is made of a size that the end 17b thereof can be clipped in position after the tube flange 11a has been entered into the cap 15 and seated on the gasket 18. Then by simply pushing the end 17b of the spring between the sides of the tube 11 and the rim edge bead 15b, the spring may be snapped into place.

The hook 19 anchored to the cap 15 by the eyelet 16 provides means for suspending the thermometer 10 from the support such as the shelves of the inside of a refrigerator (not shown) in the well understood manner.

It should be noted in practicing this invention that there is provided improved coupling or attachment means for the cap 15 with the test tube 11, which has been found in the practice of thermometer construction in the lowest price field to be cheap and efficient to a high degree since the attachment of a metal cap to a glass tube gives a great deal of trouble and annoyance because of the difference of expansion of the glass with respect to said cap on change of temperature. Furthermore, in the factory production of this type of thermometers, it has been found that the test tubes vary in diameter, whereas the metal caps are generally uniform, thereby making adhesive joints between the tubes and caps impractical structurally or economically. With the improved construction embodying the invention, such difficulties are entirely eliminated.

In Figs. 4 and 5 there is shown a modified form of the invention. Here instead of using the eyelet and hook, an angle bracket 116 is provided which is secured to the cap by a rivet 119, said bracket may be provided with holes 116a adapted to receive screws or nails for mounting the thermometer in an upright position on a vertical support (not shown).

With this modified form of the invention, the test tube 11 and scale member 12 and spirit tube 13 may be readily rotated with respect to the cap 15 so as to face in any desired direction. This desirable feature would not be possible were the test tube 11 adhesively or otherwise rigidly secured to the cap 15.

In Fig. 6 is shown the modification with the parts assembled for overhead mounting to a vertical support. To change the assembly of parts shown in Figs. 4 and 5 to that shown in Fig. 6, the cap 15 is removed from the tube 11 and the scale member 12 and spirit tube 13 reversed in the test tube 11. The cap 15 is then reapplied with the bracket arm 116 forming means for overhead mounting shown.

In Figs. 7 and 8 there is shown still another modification of the invention. Here the cap 15 is provided with a base or foot 216, the latter being fastened to the cap 15 by an eyelet rivet 219. Said base 216 may have one or more openings 216a to provide passage for outside air to and through said eyelet rivet 219 and into the test tube 11.

The cap 15 in all modifications may be applied and fitted to the tubes 11 in the same manner as described above and shown in Figs. 1, 2 and 3.

It will thus be seen that there is provided a device in which the several objects of this invention are achieved and which is adapted to meet the conditions of practical use.

As various other possible embodiments might be made of the above invention and as various changes might be made in the embodiments set forth, it is to be understood that all matters herein set forth as shown in the accompanying drawing is to be interpreted as illustrative and not in a limiting sense.

Having thus described my invention I claim as new and desire to secure by Letters Patent:

1. A thermometer comprising a glass tube having an outwardly extending flange on an open end thereof, a temperature indicating means seated in said tube, a perforated cap formed with an inturned bead fitted over said open end and flange for enclosing said indicating means, a helical spring having one end of slightly smaller diameter than the outwardly extending flange of the tube and the other end of slightly greater diameter than the inturned bead of the cap for coacting with said flange and bead to form a resilient coupling for retaining the cap in its seated position, and means secured to the cap for supporting the thermometer in a vertical position.

2. In a device of the character described, a receptacle having an outwardly extending flange on an open end thereof, a cap formed with an inturned bead fitted over said open end and flange to provide a closure for said receptacle, a helical spring having one end of slightly smaller diameter than the outwardly extending flange of the receptacle and the other end of slightly greater diameter than the inturned bead of the cap for coacting with said flange and bead to form a resilient coupling for retaining the cap in its seated position.

HERMAN NEUWIRTH.